(12) United States Patent
Ash et al.

(10) Patent No.: US 8,914,340 B2
(45) Date of Patent: Dec. 16, 2014

(54) APPARATUS, SYSTEM, AND METHOD FOR RELOCATING STORAGE POOL HOT SPOTS

(75) Inventors: Kevin John Ash, Tucson, AZ (US); Benjamin Jay Donie, Tucson, AZ (US); Andreas Bernardus Mattias Koster, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/027,140

(22) Filed: Feb. 6, 2008

(65) Prior Publication Data

US 2009/0198748 A1 Aug. 6, 2009

(51) Int. Cl.
 G06F 13/00 (2006.01)
 G06F 17/30 (2006.01)
 G06F 3/06 (2006.01)

(52) U.S. Cl.
 CPC ...... G06F 17/303 (2013.01); *G06F 2206/1012* (2013.01); *G06F 3/0611* (2013.01); *G06F 3/0683* (2013.01); *G06F 3/0647* (2013.01)
 USPC .......................................... 707/694; 711/165

(58) Field of Classification Search
 USPC ................................................ 711/165, 133
 See application file for complete search history.

(56) References Cited

U.S. PATENT DOCUMENTS

| | | | |
|---|---|---|---|
| 5,873,116 A * | 2/1999 | Van Fleet | 711/147 |
| 5,937,428 A | 8/1999 | Jantz | |
| 6,311,257 B1 | 10/2001 | Fitzgerald et al. | |
| 6,507,893 B2 | 1/2003 | Dawkins et al. | 711/133 |
| 6,681,387 B1 * | 1/2004 | Hwu et al. | 717/158 |
| 6,961,727 B2 | 11/2005 | McBrearty et al. | 707/10 |
| 7,120,729 B2 | 10/2006 | Gonzalez et al. | |
| 7,181,578 B1 * | 2/2007 | Guha et al. | 711/154 |
| 7,185,163 B1 * | 2/2007 | Knight et al. | 711/165 |
| 7,277,982 B2 | 10/2007 | Calvignac et al. | |
| 7,398,302 B2 * | 7/2008 | Yamagami et al. | 709/217 |
| 7,530,073 B1 * | 5/2009 | Shutt et al. | 718/105 |
| 7,761,684 B2 * | 7/2010 | Eguchi | 711/170 |
| 7,774,572 B2 * | 8/2010 | Yokohata et al. | 711/171 |
| 7,788,223 B2 | 8/2010 | Liu et al. | |
| 7,818,499 B2 * | 10/2010 | Arakawa et al. | 711/114 |
| 7,913,055 B2 * | 3/2011 | Karamcheti et al. | 711/203 |
| 7,984,259 B1 * | 7/2011 | English | 711/165 |
| 8,001,351 B2 * | 8/2011 | Liu et al. | 711/165 |

(Continued)

OTHER PUBLICATIONS

Vijay Sundaram et al., "Efficient Data Migration in Self-Managing Storage Systems", Autonomic Computing, 2006, ICAC '06, IEEE International Conference on Jun. 13-16, pp. 297-300.

(Continued)

*Primary Examiner* — Sherief Badawi
*Assistant Examiner* — Christopher J Raab
(74) *Attorney, Agent, or Firm* — Kunzler Law Group

(57) ABSTRACT

An apparatus, system, and method are disclosed for relocating storage pool hot spots. An identification module identifies a hot spot on a first storage pool if accesses to the first storage pool exceed an access threshold. The first storage pool is part of a plurality of storage pools. Each storage pool comprises a plurality of logical segments from a plurality of storage devices. Each storage device is of a specified class. A migration module dynamically migrates data of a first logical segment to a second storage pool. The migration is transparent to a host and the data of the first logical segment is continuously available to the host.

20 Claims, 7 Drawing Sheets

(56) References Cited

U.S. PATENT DOCUMENTS

| | | | |
|---|---|---|---|
| 8,166,270 B2* | 4/2012 | Fujibayashi et al. | 711/170 |
| 2002/0133681 A1* | 9/2002 | McBrearty et al. | 711/165 |
| 2002/0144057 A1* | 10/2002 | Li et al. | 711/112 |
| 2003/0115434 A1* | 6/2003 | Mahalingam et al. | 711/165 |
| 2004/0215713 A1 | 10/2004 | Bish et al. | 709/203 |
| 2004/0243692 A1 | 12/2004 | Arnold et al. | 709/220 |
| 2005/0268160 A1 | 12/2005 | Taylor et al. | |
| 2006/0069867 A1 | 3/2006 | Arndt et al. | |
| 2006/0112247 A1* | 5/2006 | Ramany et al. | 711/165 |
| 2006/0143419 A1* | 6/2006 | Tulyani | 711/165 |
| 2006/0161678 A1 | 7/2006 | Bopardikar et al. | 709/238 |
| 2006/0206603 A1 | 9/2006 | Rajan et al. | 709/223 |
| 2007/0118710 A1* | 5/2007 | Yamakawa et al. | 711/165 |
| 2007/0130423 A1* | 6/2007 | Liu et al. | 711/114 |
| 2007/0150687 A1 | 6/2007 | Chen et al. | |
| 2007/0150774 A1* | 6/2007 | Seng et al. | 714/699 |
| 2007/0260834 A1* | 11/2007 | Kavuri et al. | 711/162 |
| 2008/0059718 A1* | 3/2008 | Tajima et al. | 711/148 |
| 2008/0082748 A1* | 4/2008 | Liu et al. | 711/114 |
| 2009/0006734 A1* | 1/2009 | Kishi et al. | 711/111 |
| 2009/0172255 A1 | 7/2009 | Yeh et al. | |
| 2009/0193174 A1 | 7/2009 | Reid | |
| 2009/0216910 A1* | 8/2009 | Duchesneau | 709/250 |
| 2009/0240898 A1 | 9/2009 | Abe et al. | |
| 2009/0248979 A1 | 10/2009 | Kobayashi et al. | |
| 2009/0300277 A1 | 12/2009 | Jeddeloh | |
| 2010/0115175 A9 | 5/2010 | Zhuang et al. | |
| 2011/0271072 A1* | 11/2011 | Liu et al. | 711/165 |

OTHER PUBLICATIONS

"Integrated Disk Management to Provide High Performance Logical Drives for Multiple Accesses and Large Sequential Accesses to a Multi-Disk Storage Subsystem", TBD v36 n6A, pp. 553-556.

U.S. Appl. No. 12/027,152, Office Action from USPTO, Jul. 8, 2010.

Jitu J. Makwana et al., "A Nonvolatile Memory Overview", http://aplawrence.com/Makwana/nonvolmem.html.

"Flash Memory", Wikipedia, http://en.wikipedia.org/wiki/Flash_memory#NAND_memories.

"Wear Leveling", Wikipedia, http://en.wikipedia.org.wiki/Wear_leveling.

Jitu J. Makwana et al., "A Nonvolatile Memory Overview", http://aplawrence.com/Makwana/nonvolmem.html, Oct. 2004.

"Flash Memory", Wikipedia, http://en.wikipedia.org/wiki/Flash_memory#NAND_memories, downloaded on Oct. 29, 2010.

"Wear Leveling", Wikipedia, http://en.wikipedia.org.wiki/Wear_leveling, downloaded on Oct. 29, 2010.

U.S. Appl. No. 12/027,152 Office Action, dated Nov. 18, 2010.

Office Action for U.S. Appl. No. 12/027,152 dated Sep. 27, 2011.

* cited by examiner

APPARATUS, SYSTEM, AND METHOD FOR RELOCATING STORAGE POOL HOT SPOTS

REFERENCE TO CO-PENDING APPLICATIONS

Reference is hereby made to a co-pending U.S. patent application, entitled "APPARATUS, SYSTEM, AND METHOD FOR RELOCATING LOGICAL ARRAY HOT SPOTS," Ser. No. 12/027,152.

BACKGROUND OF THE INVENTION

1. Field of the Invention

This invention relates to hot spots in storage pools and more particularly relates to relocating hot spots.

2. Description of the Related Art

Storage systems often store large amounts of data across a plurality of storage devices. For example, an enterprise data processing system may store data such as transaction data, customer accounts, customer accessible product information, and the like on hard disk drives.

The storage devices may be organized into one or more storage pools. The capacity of the storage devices may further be divided into logical segments. Each storage pool may be organized in a storage hierarchy. For example, frequently accessed data may be stored in a second low latency storage pool while infrequently accessed data may be stored in a first high latency storage pool.

Some storage pools may be accessed much more frequently than other storage pools. For example, a storage pool storing customer transaction data may be accessed much more often than a storage pool storing personnel files. As a result, the latency of a heavily accessed storage pool may degrade, while the latency of a lightly accessed storage pool may remain acceptable.

Heavily accessed areas of a storage pool are referred to herein as hot spots. Performance of a storage pool may degrade because of excessive accesses to a hot spot.

SUMMARY OF THE INVENTION

From the foregoing discussion, there is a need for an apparatus, system, and method that relocates storage pool hot spots. Beneficially, such an apparatus, system, and method would reduce accesses to the storage pool hot spots.

The present invention has been developed in response to the present state of the art, and in particular, in response to the problems and needs in the art that have not yet been fully solved by currently available storage management apparatus and methods. Accordingly, the present invention has been developed to provide an apparatus, system, and method for relocating storage pool hot spots that overcome many or all of the above-discussed shortcomings in the art.

The apparatus to relocate hot spots is provided with a plurality of modules configured to functionally execute the steps of identifying a hot spot and dynamically migrating data of a first logical segment. The apparatus may include an identification module and a migration module.

The identification module identifies a hot spot on a first storage pool if accesses to the first storage pool exceed an access threshold. The first storage pool is part of a plurality of storage pools. The storage pools may be organized in a hierarchical storage system. Each storage pool comprises a plurality of logical segments from a plurality of storage devices. Each storage device is of a specified class.

The migration module dynamically migrates data of a first logical segment to second storage pool. The migration is transparent to a host and the data of the first logical segment is continuously available to the host.

A system for relocating hot spots is also presented. The system may be embodied in an enterprise data processing system and include a host, a plurality of storage pools, and controller.

The storage pools are organized in a hierarchical storage system. Each storage pool comprises a plurality of logical segments from a plurality of storage devices. Each storage device in a storage pool is of a specified class selected from an enterprise class and a nearline class. The nearline class comprises hard disk drives with a disk rotation speed in the range of 7,000 revolutions per minute to 8,000 revolutions per minute. The enterprise class comprises hard disk drives with a disk rotation speed in the range of 10,000 revolutions per minute to 20,000 revolutions per minute.

The identification module identifies a hot spot on a first storage pool if accesses to the first storage pool exceed an access threshold. The migration module dynamically migrates data of a first logical segment to a second storage pool. The migration is transparent to a host and the data of the first logical segment is continuously available to the host.

A method of the present invention is also presented for relocating hot spots. The method in the disclosed embodiments substantially includes the steps to carry out the functions presented above with respect to the operation of the described apparatus and system. In one embodiment, the method includes identifying a hot spot and dynamically migrating data of a first logical segment.

An identification module identifies a hot spot on a first storage pool if accesses to the first storage pool exceed an access threshold. The first storage pool is part of a plurality of storage pools. Each storage pool comprises a plurality of logical segments from a plurality of storage devices. Each storage device is of a specified class.

A migration module dynamically migrates data of a first logical segment to a second storage pool. The migration is transparent to a host and the data of the first logical segment is continuously available to the host.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention identifies a storage pool with excessive accesses, referred to herein as a hot spot, and relocates data of a logical segment of the storage pool to reduce the accesses. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
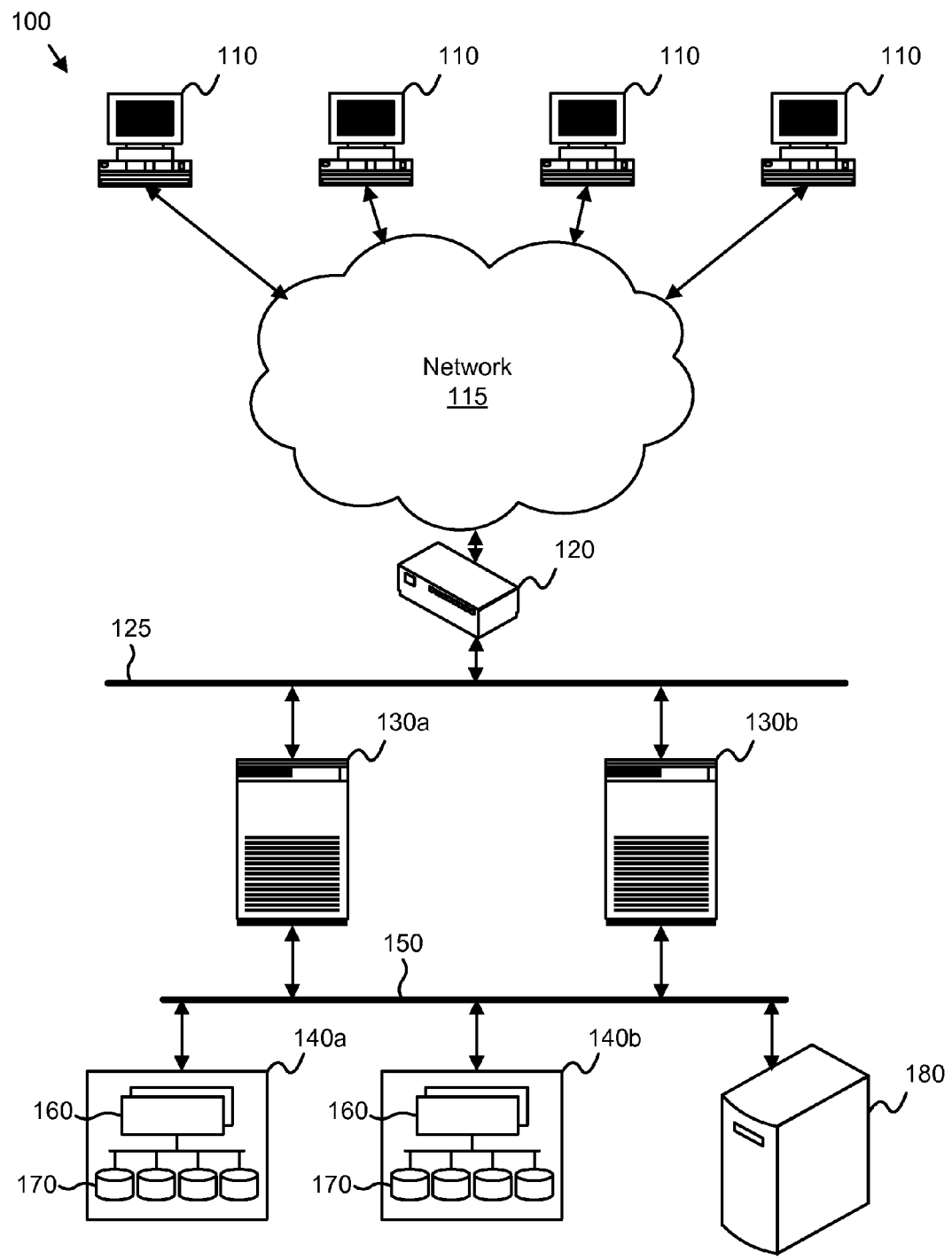
FIG. 1 is a schematic block diagram illustrating one embodiment of an enterprise data processing system in accordance with the present invention.

FIG. 1 is a schematic block diagram illustrating one embodiment of an enterprise data processing system (DPS) 100 in accordance with the present invention. The DPS 100 includes one or more host computers 110, a network 115, a router 120, an internal network 125, one or more servers 130, a storage communications channel 150, a tape drive 180, and one or more storage subsystems 140.

As used herein, the host computers 110 are referred to as hosts 110. The servers 130 may be configured as mainframe computers, blade centers comprising multiple blade servers, and the like. Although for simplicity four hosts 110, one network 115, one router 120, one internal network 125, two servers 130, one storage communications channel 150, one tape drive 180, and three storage subsystems 140 are shown, any number of hosts 110, networks 115, routers 120, internal networks 125, servers 130, storage communications channels 150, tape drives 180, and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives. In one embodiment, the DPS 100 provides data storage and data manipulation services for the hosts 110. For example, a host 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the host 110. In one embodiment, the server 130 may execute a database application used by the host 110 to access the data.

The tape drive 180 may store data on one or more magnetic tapes. Magnetic tapes are referred to herein as tapes. A host 110 may access data directly from a tape. Alternatively, data may be migrated from a storage device 170 to a tape and/or from a tape to a storage device 170.

One or more hosts 110 may access a storage device 170 excessively. As a result, access to the data on the storage device 170 may degrade. The present invention mitigates excessive accesses to a storage device hot spot as will be described hereafter.

Figure 2:
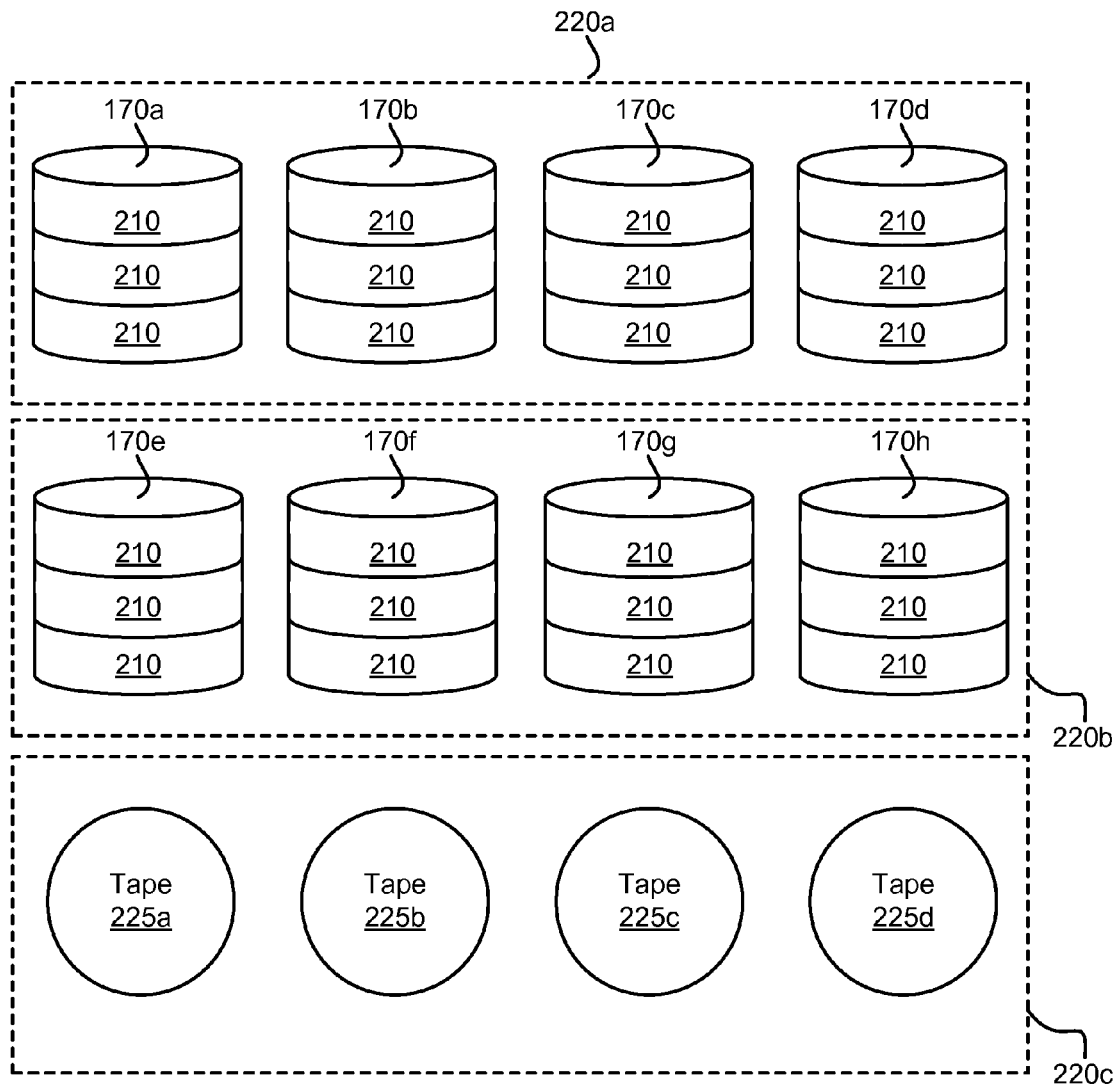
FIG. 2 is a schematic block diagram illustrating one embodiment of storage pools of the present invention.

FIG. 2 is a schematic block diagram illustrating one embodiment of storage pools 220 of the present invention. The storage pools 220 are logical organizations of the storage devices 170 of the DPS 100 of FIG. 1. The description of the storage pools 220 refers to elements of FIG. 1, like numbers referring to like elements. Three storage pools 220a-c are shown. However, a DPS 100 may include any number of storage pools 220.

A first and second storage pool 220a-b includes hard disk drive storage devices 170. A third storage pool 220c includes tapes 225. The tapes 225 may be accessed using the tape drive 180.

Each storage device 170 or tape 225 in a storage pool 220 conforms to a class. Some storage devices 170 may conform to a nearline class and comprise hard disk drives with a disk rotation speed in the range of 7,000 revolutions per minute to 8,000 revolutions per minute. Other storage devices 170 may conform to an enterprise class and comprise hard disk drives with a disk rotation speed in the range of 10,000 revolutions per minute to 20,000 revolutions per minute. Tapes 225 may conform to a one hundred gigabyte (100 GB) class, a five hundred gigabyte (500 GB) class, and the like.

For example, the second storage pool 220b may include all storage devices 170 of the enterprise class. The first storage pool 220a may include all storage devices 170 of the nearline class. The third storage pool 220c may include all one hundred gigabyte (100 GB) class tapes 225. Each storage device 170 is divided into one or more physical segments 210. Each tape 225 may also be divided in physical segments.

Data may be assigned to a storage pool 220 according to a storage policy. For example, the storage policy may assign active customer accounts to the second storage pool 220b and inactive customer accounts to the first storage pool 220a. In addition, the storage policy may assign transactions that occurred over ten years in the past to the third storage pool 220c. The enterprise class storage devices 170 of the second storage pool 220b may make the active customer accounts accessible with a low latency while the nearline class storage devices 170 of the first storage pool 220a may make the inactive customer accounts accessible with a high latency.

Data may be migrated between storage pools 220 as the status of the data changes. Unfortunately, the storage policy may assign data to a storage pool 220 that is not appropriate for the levels and frequency of access to the data. For example, if data on a storage device 170 of the second storage pool 220b is accessed frequently, the latency of the storage device 170 may exceed an acceptable level.

Figure 3:
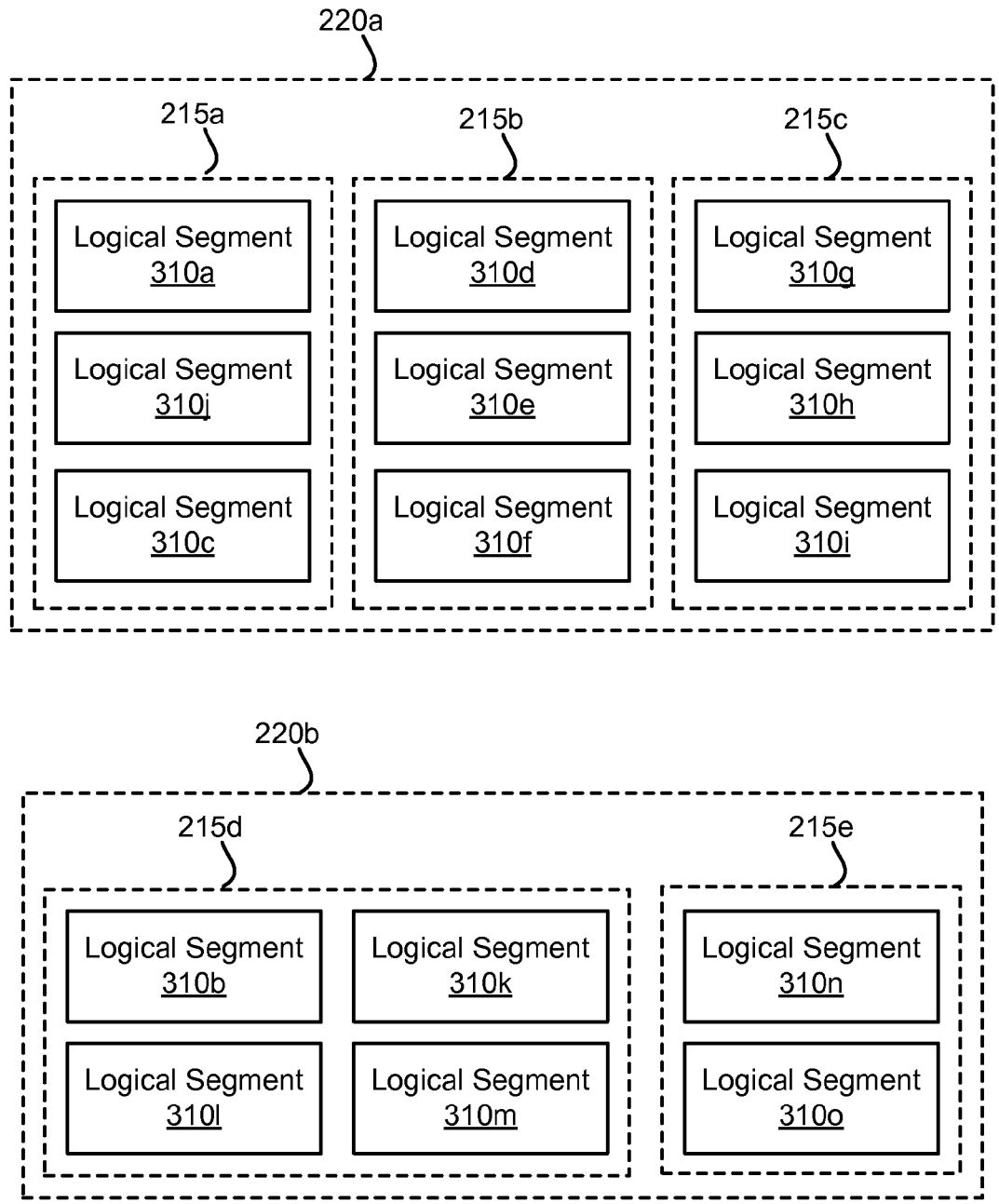
FIG. 3 is a schematic block diagram illustrating one alternate embodiment of storage pools of the present invention.

FIG. 3 is a schematic block diagram illustrating one alternate embodiment of the storage pools 220 of the present invention. The description of the storage pools 220 refers to elements of FIGS. 1-2, like numbers referring to like elements.

The first and second storage pools 220a-b of FIG. 2 are shown comprised of a plurality of logical segments 310. Each logical segment 310 may comprise one or more physical segments 210. For example, each logical segment 310 may comprise a one megabyte (1 MB) physical segment 210. The logical segments 310 of a storage pool 220 may be allocated from any storage device 170 conforming to the class of the storage pool 220. Continuing the previous example, the logical segments 310 of the second storage pool 220b may include physical segments 210 from any storage device 170 that conforms to the enterprise class and the logical segments 310 of the first storage pool 220a may include physical segments 210 from any storage device 170 that conforms to the nearline class.

The logical segments 310 may further be organized into logical arrays 215. Each storage pool 220 may include one or more logical arrays 215.

Some logical segments 310 may be accessed more than other logical segments 310. For example, a first logical segment 310a may store an often accessed portion of an inactive customer account. Multiple hosts 110 may access the first logical segment 310a, resulting in degraded performance for all accesses to the first storage pool 220a. The present invention migrates data of logical segments 310 to reduce hot spots in a storage pool 220. For example, data stored on the first logical segment 310a of the overdriven first storage pool 220a may be migrated to the second storage pool 220b as the second storage pool 220b is better able to provide frequent access to the data. The physical location of the data is migrated to improve performance and better utilize the storage hierarchy as will be described hereafter.

Figure 4:
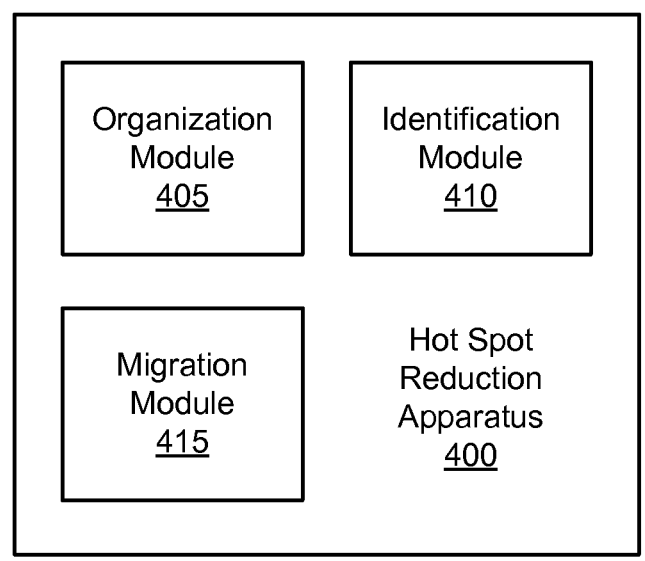
FIG. 4 is a schematic block diagram illustrating one embodiment of a hot spot reduction apparatus of the present invention.

FIG. 4 is a schematic block diagram illustrating one embodiment of a hot spot reduction apparatus 400 of the present invention. The description of the hot spot reduction apparatus 400 refers to elements of FIGS. 1-3, like numbers referring to like elements. The hot spot reduction apparatus 400 includes an organization module 405, an identification module 410, and a migration module 415.

The organization module 405 may comprise computer executable code stored on a tangible storage device such as a memory of a server 130. The code may be executed by a processor such as a server processor. Alternatively the code may be stored in memory of a storage controller 160 and executed by a storage controller processor.

The organization module 405 organizes a plurality of storage pools 220. Each storage pool 220 comprises of a plurality of logical segments 310 from a plurality of storage devices 170 of a specified class. The storage pools 220 may be organized in a hierarchical storage system.

The identification module 410 comprises computer executable code stored on the tangible storage device such as a memory of a server 130. The code may be executed by server processor. Alternatively the code may be stored in memory of a storage controller 160 and executed by a storage controller processor. The identification module 410 identifies a hot spot in a first storage pool 220a if accesses to the first storage pool 220a exceed an access threshold.

The migration module 415 includes computer executable code stored on the tangible storage device and executed by the processor. In one embodiment, the code is stored on a server memory and executed by a server processor. Alternatively, the code is stored on a storage controller memory and executed by a storage controller processor. The migration module 415 dynamically migrates data of a first logical segment 310a from the first storage pool 220a to a second logical segment 310b of a second storage pool 220b. The migration is transparent to a host 110. The data of the first logical segment 210 is continuously available to the host 110.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
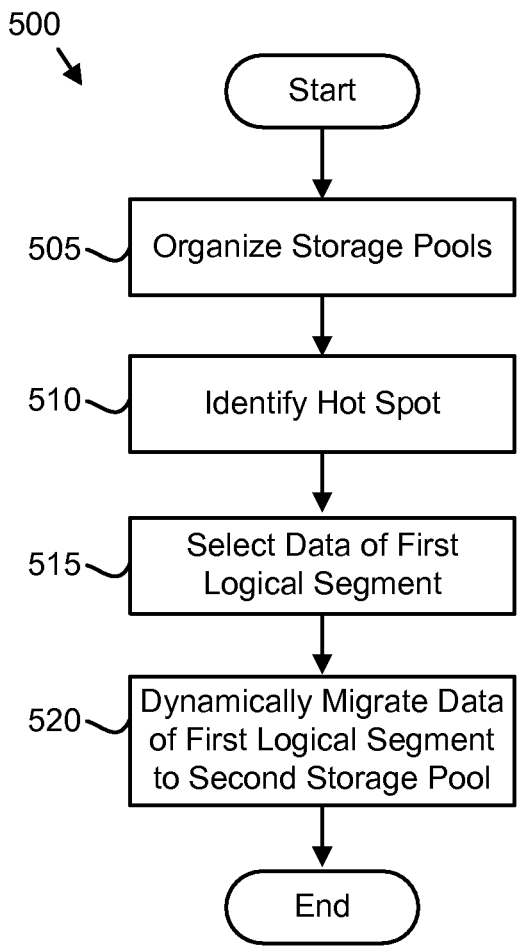
FIG. 5 is a schematic flow chart diagram illustrating one embodiment of a hot spot reduction method of the present invention.

FIG. 5 is a schematic flow chart diagram illustrating one embodiment of a hot spot reduction method 500 of the present invention. The method 500 substantially includes the steps to carry out the functions presented above with respect to the operation of the described apparatus and system of FIGS. 1-4. The description of the method 500 refers to elements of FIGS. 1-4, like numbers referring to like elements.

In one embodiment, the method 500 is implemented with a computer program product comprising a tangible computer readable medium having a computer readable program. The computer readable program may be executed by a processor of the server 130 and/or storage controller 160, wherein the program in combination with the processor is capable of performing the method 500.

The hot spot reduction method 500 begins and the organization module 405 organizes 505 the storage pools 220. For example, the organization module 405 may organize a plurality of logical segments 310 into one or more storage pools 220. Each logical segment 310 may comprise one or more physical segments 210 from a specified class. For example, a logical segment 310 may comprise a one megabyte (1 MB) physical segment 210 of an enterprise class storage device 170.

The identification module 410 identifies 510 a hot spot on a first storage pool 220a if accesses to the first storage pool 220a exceed an access threshold. In one embodiment, each storage pool 220 includes a wait queue. The wait queue may store read and write commands before each command is completed. For example, the wait queue may store a write command until the write commands data is written to a storage device 170. The identification module 410 may identify 510 the hot spot on the first storage pool 220a when a wait queue count exceeds a specified access threshold. In one embodiment, the specified access threshold is sixteen (16) commands in the wait queue.

In an alternate embodiment, accesses to the first storage pool 220a exceed the access threshold when a number of accesses over an access time interval exceeds the access threshold. For example, the identification module 410 may record a time of each storage pool access and calculate the number of accesses for one or more time intervals. The identification module 410 may identify 510 the hot spot if accesses to the storage pool 220 exceed an access threshold, such as two hundred and fifty accesses/minute (250/min).

Alternatively, the identification module 410 may track a quantity of data transferred by the first storage pool 220s over the one or more time intervals. For example, the identification module 410 may record a number of megabytes of data transferred over a one minute interval. The identification module 410 may identify 510 the hot spot if the data transferred by the storage pool 220 exceed an access threshold such as fifty megabytes/minute (50 MB/min).

The access threshold of the first storage pool 220a may be different from the access threshold of the second storage pool 220b. For example, if the first storage pool 220a is configured to support a lower number of accesses, the first storage pool 220a may have an access threshold of one hundred accesses/minute (100/min) while the second storage pool 220b has an access threshold of two hundred accesses/minute (200/min).

In one embodiment, the logical segments 310 in each storage pool 220 may have a current usage corresponding to accesses to each logical segment 310. The current usage information may comprise accesses to the logical segment 310, data transferred by the logical segment 310, and the like.

The identification module 410 may identify 510 the hot spot on the first storage pool 220a if a number of logical segments 310 with a current usage greater than a use threshold exceeds an access threshold. For example, the access threshold may specify that no more than five (5) logical segments 310 in the first storage pool 220a may have a current usage that exceeds the use threshold. The use threshold may specify that the logical segment 310 transfer no more than five hundred kilobytes/second (500 kB/s). Alternatively, the use threshold may specify that the logical segment 310 have no more than twenty-five accesses per second (25/s). If more than five logical segments 310 exceed the use threshold, then the identification module 410 may identify 510 the first storage pool 220a as a hot spot.

In one embodiment, the migration module 415 selects 515 data of a first logical segment 310a for migration in response to a migration policy. The migration module 415 may select 515 the data of the first logical segment 310a if the accesses to the first logical segment 310a exceed the use threshold. In one embodiment the logical segment usage is monitored and if the logical segment usage exceeds the use threshold, then the data of the logical segment 310 becomes a candidate for migration to a second storage pool 220b.

In one embodiment, the migration policy specifies selecting a first logical segment 310a with the highest current usage. For example, the first logical segment 310a may be selected for migration to another storage pool 220 if the logical segment current usage of one megabyte per minute (1 MB/min) is the highest current usage.

The migration module 415 dynamically migrates 520 the data of the first logical segment 310a from the first storage pool 220a to a second logical segment 310b of a second storage pool 220b. The migration is transparent to the hosts 110 and data of the first logical segment 210 is continuously available to the host 110. For example, while the first logical segment 310a is migrated from the first storage pool 220a to the lower latency second storage pool 220b, the data of the first logical segment 310a remains available to the hosts 110.

The migration module 415 may migrate 520 the data of the first logical segment 310a using a Flash Copy algorithm. The Flash Copy algorithm may support instantaneous access to the data on the new rank while it is being copied from the old set of ranks.

In one embodiment, the Flash Copy algorithm makes a second image of data available. The Flash Copy algorithm is sometimes known in other system contexts as Point-In-Time copy, or TO-copy. The second image's contents are initially identical to that of the first. The second image is made available 'instantly.' In practical terms this means that the second image is made available in much less time than would be required to create a true, separate, physical copy, and that this means that it can be established without unacceptable disruption to a using application.

The volume relationship with the host 110 remains unchanged. However, the physical location of the data may be migrated to improve performance. By migrating the logical segments 310, the present invention improves load balancing, capacity balancing, and performance.

Figure 6:
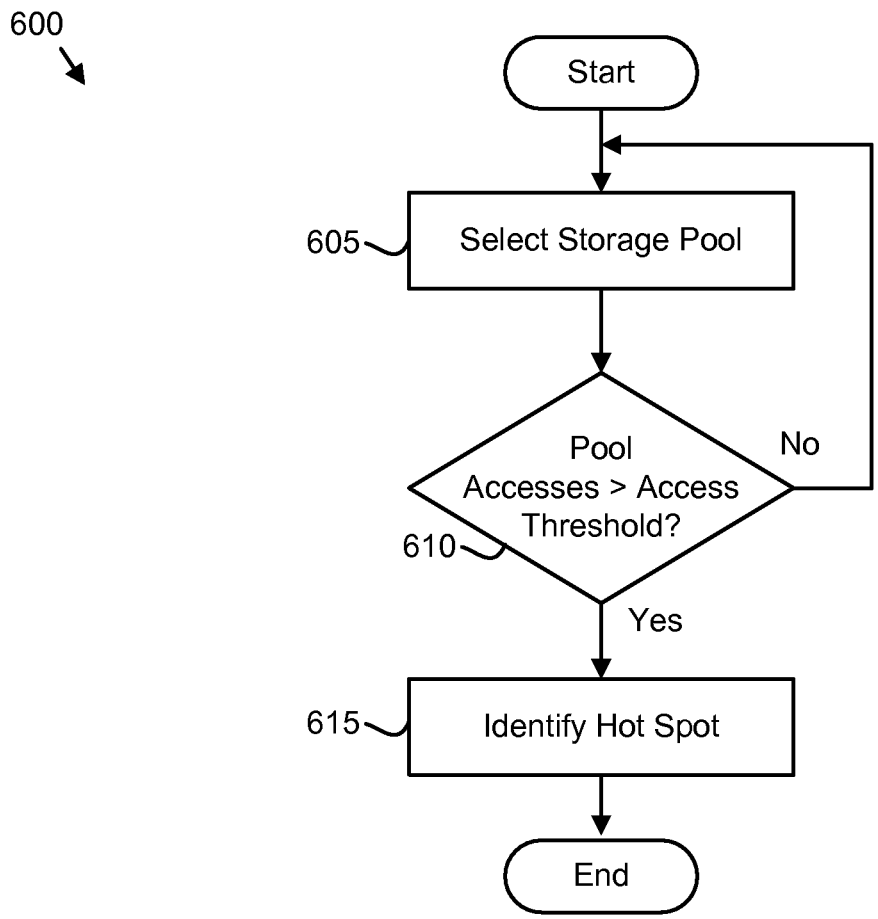
FIG. 6 is a schematic flow chart diagram illustrating one embodiment of a hot spot identification method of the present invention.

FIG. 6 is a schematic flow chart diagram illustrating one embodiment of a hot spot identification method 600 of the present invention. The method 600 substantially includes the steps to carry out the functions presented above with respect to the operation of the described apparatus and system of FIGS. 1-4, and may embody step 510 of FIG. 5. The description of the method 600 refers to elements of FIGS. 1-5, like numbers referring to like elements. In one embodiment, the method 600 is implemented with a computer program product comprising a computer readable medium having a computer readable program. The computer readable program may be integrated into a processor of the server 130 and/or storage controller 160, wherein the program in combination with the processor is capable of performing the method 600.

The method 600 begins and the organization module 405 selects 605 a storage pool 220. In one embodiment, the organization module 405 selects 605 each storage pool 220 in turn so that all storage pools 220 are eventually selected. Alternatively, the organization module 405 may select 605 a storage pool 220 that with a highest number of accesses.

The identification module 410 determines 610 if storage pool accesses exceed the access threshold. For example, an initial segment count, maximum segments allocated, current segments allocated, current free segments, current tracks allocated, and current wait queue count may be recorded over a specified time interval. The initial segment count, maximum segments allocated, current segments allocated, current free segments, current tracks allocated, and current wait queue count may be tabulated to determine the storage pool accesses for the storage pool 220.

If the storage pool accesses exceed the access threshold, the identification module 410 identifies 615 the storage pool 220 as a hot spot and the method 600 ends. The access threshold may be defined as the maximum number of times the storage pool 220 is accessed per time interval such as four hundred times per minute (400/min). If the storage pool accesses do not exceed the access threshold, the organization module 405 may select 605 another storage pool 220.

Figure 7:
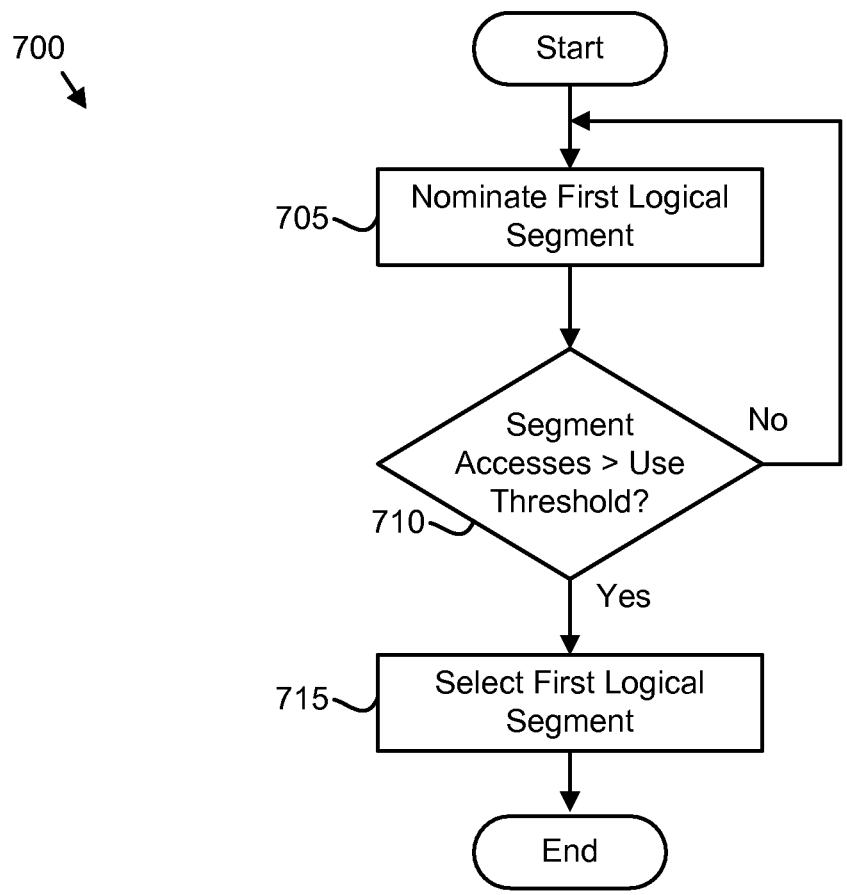
FIG. 7 is a schematic flowchart diagram illustrating one embodiment of a logical segment identification method of the present invention.

FIG. 7 is a schematic flowchart diagram illustrating one embodiment of a logical segment identification method 700 of the present invention. The method 700 may embody step 515 of FIG. 5. The description of the method 700 refers to elements of FIGS. 1-4, like numbers referring to like elements. In one embodiment, the method 700 is implemented with a computer program product comprising a computer readable medium having a computer readable program. The computer readable program may be integrated into a processor of the server 130 and/or storage controller 160, wherein the program in combination with the processor is capable of performing the method 700.

The hot spot identification method 700 begins and the organization module 405 nominates 705 a first logical segment 310*a*. The organization module 405 may nominate 705 the logical segment 310 with the highest current usage. In one embodiment, the organization module 405 nominates 705 the logical segment 310 with the highest latency. Alternatively, the organization module 405 may nominate the logical segment 310 with the greatest number of errors such as correctable soft errors.

The identification module determines 710 if segment accesses are greater than the use threshold. The use threshold may be defined as the maximum number of times the logical segment 310 may be accessed effectively over a specified time interval. If the segment accesses are greater than the use threshold then the logical segment 310 is selected 715 for migration and the method 700 ends. For example, the first logical segment 310*a* may be selected 715 for migration to the second storage pool 220*b* if the logical segment current usage of one megabyte per minute (1 MB/min) exceeds the exemplary use threshold of five hundred kilobytes/min (500 kB/min). If the segment accesses are not greater than the use threshold, the organization module 405 may nominate 705 another logical segment 310.

The present invention identifies a hot spot storage pool 220 and relocates data of a logical segment 310 of the storage pool 220. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium storing a computer readable program, wherein the computer readable program when executed on a computer causes the computer to:

identify a first storage pool as a hot spot by determining a number of a first plurality of logical segments in the first storage pool with a current usage greater than a use threshold and identifying the first storage pool as the hot spot if the number exceeds an access threshold for a first storage pool, wherein the first plurality of logical segments are in the first storage pool of a plurality of storage pools;

in response to the number of the first plurality of logical segments with current usage greater than the use threshold exceeding the access threshold, selecting a first logical segment of the first plurality of logical segments that has a greatest number of correctable errors and a highest latency from among the first plurality of logical segments, wherein each storage pool comprises logical segments from a plurality of storage devices, first data of the first logical segment is assigned to a single storage pool according to a storage policy, and each storage device of the first storage pool is of a nearline class; and dynamically migrate the first data of the first logical segment to a second storage pool, wherein the migration is transparent to a host, the first data of the first logical segment is continuously available to the host, and each storage device of the second storage pool is of an enterprise class.

2. The computer program product of claim 1, wherein each storage pool is organized in a hierarchical storage system.

3. The computer program product of claim 1, wherein the first logical segment is selected if the first logical segment has the greatest number of correctable errors and the highest latency, the quantity of data transferred over the access time interval exceeds the access threshold, and a wait queue count exceeds a wait queue access threshold.

4. The computer program product of claim 1, wherein the first logical segment is selected if the first logical segment has the greatest number of correctable errors and the highest latency, the quantity of data transferred over the access time interval exceeds the access threshold, and a number of accesses over the access time interval exceeds an access number threshold.

5. The computer program product of claim 1, wherein the first logical segment is selected from the first plurality of logical segments if the first logical segment has the greatest number of correctable errors, the highest latency, and in response to a migration policy.

6. The computer program product of claim 5, wherein the first logical segment is selected if the first logical segment has the greatest number of correctable errors, a highest latency, and the accesses to the first logical segment exceed the use threshold.

7. The computer program product of claim 1, wherein the nearline class comprises hard disk drives with a disk rotation speed in the range of 7,000 revolutions per minute to 8,000 revolutions per minute and the enterprise class comprises hard disk drives with a disk rotation speed in the range of 10,000 revolutions per minute to 20,000 revolutions per minute.

8. An apparatus for relocating hot spots, the apparatus comprising a computer readable storage medium storing a computer readable program;

a processor and memory executing the computer readable program, the computer readable program comprising:

an identification module identifying a first storage pool as a hot spot by determining a number of a first plurality of logical segments in the first storage pool with a current usage greater than a use threshold and identifying the first storage pool as the hot spot if the number exceeds an access threshold for a first storage pool, wherein the first plurality of logical segments are in the first storage pool of a plurality of storage pools;

in response to the number of the first plurality of logical segments with current usage greater than the use threshold exceeding the access threshold, selecting a first logical segment of the first plurality of logical segments that has a greatest number of correctable errors and a highest latency from among the first plurality of logical segments, wherein each storage pool comprises logical segments from a plurality of storage devices, first data of the first logical segments is assigned to a single storage pool according to a storage policy and each storage device of the first storage pool is of a nearline class; and a migration module dynamically migrating the first data of the first logical segment to a second storage pool, wherein the migration is transparent to a host, the first data of the first logical segment is continuously available to the host, each storage device of the second storage pool is of an enterprise class.

9. The apparatus of claim 8, wherein the first logical segment is selected if the first logical segment has the greatest number of correctable errors and the highest latency, the quantity of data transferred over the access time interval exceeds the access threshold, and a wait queue count exceeds a wait queue access threshold.

10. The apparatus of claim 8, wherein the first logical segment is selected if the first logical segment has the greatest number of correctable errors and the highest latency, the quantity of data transferred over the access time interval exceeds the access threshold, and a number of accesses over the access time interval exceeds the access number threshold.

11. A method for deploying computer infrastructure, comprising integrating a computer readable program into a computing system, wherein the program executed by the computing system performs the following:

identifying a first storage pool as a hot spot by determining a number of a first plurality of logical segments in the first storage pool with a current usage greater than a use threshold and identifying the first storage pool as the hot spot if the number exceeds an access threshold for a first storage pool, wherein the first plurality of logical segments are in the first storage pool of a plurality of storage pools;

in response to the number of the first plurality of logical segments with current usage greater than the use threshold exceeding the access threshold, selecting a first logical segment that has a greatest number of correctable errors and a highest latency from among the first plurality of logical segments in a first storage pool, wherein the each storage pool comprises logical segments from a plurality of storage devices, first data of the first logical segment is assigned to a single storage pool according to a storage policy and each storage device of the first storage pool is of a nearline class; and dynamically migrating the first data of the first logical segment to a second storage pool, wherein the migration is transparent to a host, the first data of the first logical segment is continuously available to the host, and each storage device of the second storage pool is of an enterprise class.

12. The method of claim 11, wherein the first logical segment is selected if the first logical segment has the greatest number of correctable errors and the highest latency, the quantity of data transferred over the access time interval exceeds the access threshold, and a wait queue count exceeds a wait queue access threshold.

13. The method of claim 11, wherein the first logical segment is selected if the first logical segment has the greatest number of correctable errors and the highest latency, the quantity of data transferred over the access time interval exceeds the access threshold, and a number of accesses over the access time interval exceeds the access number threshold.

14. The method of claim 11, wherein the first logical segment is selected if the first logical segment has the greatest number of correctable errors, the highest latency, and in response to a migration policy.

15. The method of claim 14, further comprising selecting the first logical segment if the first logical segment has the greatest number of correctable errors, the highest latency, and the accesses to the first logical segment exceed the use threshold.

16. A system for relocating hotspots, the system comprising:

a host;

a plurality of storage pools organized in a hierarchical storage system, each storage pool comprising a plurality of logical segments from a plurality of storage devices, wherein;

a controller with a processor executing computer readable code stored on a tangible storage device and comprising an identification module identifying a first storage pool as a hot spot by determining a number of a first plurality of logical segments in the first storage pool with a current usage greater than a use threshold and identifying the first storage pool as the hot spot if the number exceeds an access threshold for a first storage pool, wherein the first plurality of logical segments are in the first storage pool of a plurality of storage pools;

in response to the number of the first plurality of logical segments with current usage greater than the use threshold exceeding the access threshold, selecting a first logical segment of the first plurality of logical segments that has a greatest number of correctable errors and a highest latency from among the first plurality of logical segments, wherein the first data of the hot spot is assigned to a single storage pool according to a storage policy and each storage device of the first storage pool is of a nearline class; and a migration module dynamically migrating first data of the first logical segment to a second storage pool, wherein the migration is transparent to the host, the first data of the first logical segment is continuously available to the host, and each storage device of the second storage pool is of an enterprise class.

17. The computer program product of claim 1, wherein the current usage of each logical segment is greater than the use threshold if a quantity of data transferred per second to the logical segment exceeds the use threshold, wherein the use threshold is measured in quantity of data per second.

18. The apparatus of claim 8, wherein the current usage of each logical segment is greater than the use threshold if a quantity of data transferred per second to the logical segment exceeds the use threshold, wherein the use threshold is measured in quantity of data per second.

19. The method of claim 11, wherein the current usage of each logical segment is greater than the use threshold if a quantity of data transferred per second to the logical segment exceeds the use threshold, wherein the use threshold is measured in quantity of data per second.

20. The system of claim 16, wherein the current usage of each logical segment is greater than the use threshold if a quantity of data transferred per second to the logical segment exceeds the use threshold, wherein the use threshold is measured in quantity of data per second.

\* \* \* \* \*